US006980215B2

(12) United States Patent
Chupeau et al.

(10) Patent No.: US 6,980,215 B2
(45) Date of Patent: Dec. 27, 2005

(54) METHOD AND DEVICE FOR PROCESSING IMAGES TO CORRECT DEFECTS OF MOBILE OBJECT DISPLAY

(75) Inventors: Bertrand Chupeau, Rennes (FR); Didier Doyen, La Bouexière (FR)

(73) Assignee: Thomson Licensing, Boulogne-Billancourt (FR)

( * ) Notice: Subject to any disclaimer, the term of this patent is extended or adjusted under 35 U.S.C. 154(b) by 342 days.

(21) Appl. No.: 10/381,559

(22) PCT Filed: Sep. 14, 2001

(86) PCT No.: PCT/FR01/02854

§ 371 (c)(1), (2), (4) Date: Mar. 27, 2003

(87) PCT Pub. No.: WO02/27702

PCT Pub. Date: Apr. 4, 2002

(65) Prior Publication Data

US 2004/0095365 A1 May 20, 2004

(30) Foreign Application Priority Data

Sep. 27, 2000 (FR) .................................. 00 12332

(51) Int. Cl.[7] .............................................. G06T 15/00

(52) U.S. Cl. ...................... 345/473; 345/60; 315/169.3

(58) Field of Search ........................... 345/418, 60, 66, 345/67, 473, 474, 475; 315/169.3, 169.4

(56) References Cited

U.S. PATENT DOCUMENTS

| | | | | |
|---|---|---|---|---|
| 5,907,316 | A * | 5/1999 | Mikoshiba et al. | 345/596 |
| 6,496,194 | B1 * | 12/2002 | Mikoshiba et al. | 345/596 |
| 6,529,204 | B1 * | 3/2003 | Mikoshiba et al. | 345/597 |
| 6,720,940 | B2 * | 4/2004 | Awamoto et al. | 345/60 |

FOREIGN PATENT DOCUMENTS

| | | |
|---|---|---|
| EP | 882 536 A2 | 2/1998 |

* cited by examiner

*Primary Examiner*—Phu K. Nguyen
(74) *Attorney, Agent, or Firm*—Joseph S. Tripoli; Harvey D. Fried; Sammy S. Henig

(57) ABSTRACT

The invention carries out a movement compensation of contouring defects. The movement compensation is carried out, for each subfield, by assigning, to each cell, the state which would correspond to a movement-compensating intermediate image located at the instant of said subfield. The method of the invention associates a single movement vector Vm with each cell Ci so as to constitute an intermediate image for each subfield.

7 Claims, 5 Drawing Sheets

METHOD AND DEVICE FOR PROCESSING IMAGES TO CORRECT DEFECTS OF MOBILE OBJECT DISPLAY

This application claims the benefit under 35 U.S.C. § 365 of International Application PCT/FR01/02854, filed Sep. 14, 2001, which claims the benefit of French Patent Application No. 00/12332, filed Sep. 27, 2000.

FIELD OF THE INVENTION

The invention relates to an image processing method and device for correcting defects in the display of moving objects. More particularly, the invention relates to corrections to defects produced by display devices using temporal integration of the image subfields to reproduce grey levels.

The display devices in question employ a matrix of elementary cells which are either in the on state or in the off state. Among display devices, the invention relates more particularly to plasma display panels.

BACKGROUND OF THE INVENTION

Plasma display panels, called hereafter PDPs, are flat-type display screens. There are two large families of PDPs, namely PDPs whose operation is of the DC type and those whose operation is of the AC type. In general, PDPs comprise two insulating tiles (or substrates), each carrying one or more arrays of electrodes and defining between them a space filled with gas. The tiles are joined together so as to define intersections between the electrodes of the said arrays. Each electrode intersection defines an elementary cell to which a gas space corresponds, which gas space is partially bounded by barriers and in which an electrical discharge occurs when the cell is activated. The electrical discharge causes an emission of UV rays in the elementary cell and phosphors deposited on the walls of the cell convert the UV rays into visible light.

In the case of AC-type PDPs, there are two types of cell architecture, one called a matrix architecture and the other called a coplanar architecture. Although these structures are different, the operation of an elementary cell is substantially the same. Each cell may be in the ignited or "on" state or in the extinguished or "off" state. A cell may be maintained in one of these states by sending a succession of pulses, called sustain pulses, throughout the duration over which it is desired to maintain this state. A cell is turned on, or addressed, by sending a larger pulse, usually called an address pulse. A cell is turned off, or erased, by nullifying the charges within the cell using a damped discharge. To obtain various grey levels, use is made of the eye's integration phenomenon by modulating the durations of the on and off states using subfields, or subframes, over the duration of display of an image.

In order to be able to achieve temporal ignition modulation of each elementary cell, two so-called "addressing modes" are mainly used. A first addressing mode, called "addressing while displaying", consists in addressing each row of cells while sustaining the other rows of cells, the addressing taking place row by row in a shifted manner. A second addressing mode, called "addressing and display separation", consists in addressing, sustaining and erasing all of the cells of the panel during three separate periods. For more details concerning these two addressing modes, a person skilled in the art may, for example, refer to U.S. Pat. Nos. 5,420,602 and 5,446,344.

Whatever the addressing mode used, there are many problems associated with the temporal integration of the cells operating in on/off mode. One problem, that of contouring, consists of the appearance of a darker or lighter, or even coloured, line upon displacement of a transition area between two colours. The contouring phenomenon is all the more perceptable when the transition takes place between two very similar colours that the eye associates with the same colour. A contour sharpness problem also occurs with moving objects.

FIG. 1 shows a time division for displaying two consecutive images with a transition that moves. The total display time of the image is 16.6 or 20 ms, depending on the country. During the display time, eight subfields associated with periods of weights 1, 2, 4, 8, 16, 32, 64 and 128 are produced so as to allow 256 grey levels per cell. Each subfield makes it possible for an elementary cell to be illuminated or not for an illumination time equal to the weights 1, 2, 4, 8, 16, 32, 64 or 128 multiplied by an elementary time. The illumination times are separated by erasing and addressing operations during which the cells are off.

A transition on one colour between a level 128 and a level 127 is represented for an image I and an image I+1 with a shift of 5 pixels. The integration performed by the eye amounts to temporally integrating the oblique lines shown. The result of the integration is manifested by the appearance of a grey level equal to zero at the moment of the transition between the levels 128 and 127, whereas the human eye does not make a distinction between these two levels. When the transition occurs from the level 127 to the level 128, a level 0 appears, conversely, when transition occurs from the level 128 to the level 127, a level 255 appears. When the three primary colours (red, green and blue) are combined together, this change in level may be coloured and become even more visible.

A first solution consists in "breaking" the high weights in order to minimize the error. FIG. 2 shows the same transition as FIG. 1 using seven subfields of weight 32 instead of three subfields of weights 32, 64 and 128. The eye's integration error then occurs on a maximum value equal to a level 32. Many other solutions have been provided, by varying the weights of the subfields so as to minimize the error. However, whatever the solution adopted for the brightness distribution of the various subfields, there always remains a display error due to the coding.

In European Application No. 0 978 817 (hereafter called D1), it is proposed to correct the image according to the observed movements. In D1, movement vectors are calculated for all the pixels of an image to be displayed and then the subfields are moved along these vectors according to the various weights of the subfields. The correction thus obtained is shown in FIG. 3. The result of this correction gives an excellent result on the transitions that cause contouring effects, as generally the areas belonging to a transition subject to contouring move with the same movement vector.

However, the correction described in D1 has a few drawbacks when put into practice on sequences in which the objects cross over. FIG. 4 illustrates a movement vector field obtained from estimators of the prior art. Associated with each point of the current image (image I) is a movement vector indicating the direction of the movement with respect to the previous image (image I−1). When a moving object moves in front of a background, part of the background appears while another part of the background disappears. If it is attempted to displace the subfields of the current image along the movement vectors, a conflict area 1 and a hole area 2 appear. The conflict area 2 is characterized by the crossing of the movement vector, which imposes two values on a given subfield for a given point. The hole area is characterized by the absence of information.

SUMMARY OF THE INVENTION

The invention provides a method for carrying out movement compensation for contouring defects. According to the invention, a movement compensation is carried out by determining, for each subfield, the state of each cell by assigning to it the state which would correspond to a movement-compensated intermediate image located at the instant of the said subfield.

The invention is a method for displaying a video image on a display device, which comprises a plurality of cells in which the grey levels are obtained by temporal integration over a given period of a plurality of subfields for which each cell is either on or off. For each subfield, an intermediate image corresponding to the instant of the said subfield is calculated, each intermediate image being movement compensated. Next, the state of each cell for each subfield is determined by assigning thereto the value of the cell corresponding to the intermediate image associated with the said subfield.

Preferably, an estimation of the movement between the image to be displayed and the previous image is made, the movement vectors obtained by the movement estimation being grouped in parallel vector fields. For each subfield and for each cell, the movement vector which is applied is determined and then the corresponding grey level is determined according to the image to be displayed and/or the image which precedes the image to be displayed.

Three situations can be envisaged, depending on the various areas of the image for a given subfield. If a cell is subjected to a single parallel-vector field, then the vector which is associated with it corresponds to the vector field and the grey level corresponds to that grey level of the image to be displayed to which the vector points. If a cell is subjected to at least two parallel-vector fields, then the vectors parallel to all the fields passing through the cell are determined and that vector for which the grey levels of the image to be displayed and of the previous image are the closest is associated with the cell, the grey level associated with the cell corresponding to that grey level of the image to be displayed to which the associated vector points. If a cell is not subjected to any vector field, then a resulting vector corresponding to an average of the neighbouring vectors is calculated and the grey level of the previous image, corresponding to the resulting vector, is associated with the cell.

As a variant, if a cell is not subjected to any vector field, then the movement vectors of the previous image are extended and a vector parallel to the field of extended vectors of the previous image which surrounds the cell is assigned, the grey level associated with the cell corresponding to that grey level of the previous image through which the vector assigned to the cell passes.

The invention also relates to a display device which employs the method defined above. More particularly, the device includes a plasma panel.

BRIEF DESCRIPTION OF THE DRAWINGS

The invention will be more clearly understood and further features and advantages will become apparent on reading the description which follows, the description referring to the appended drawings in which.

DETAILED DESCRIPTION

Figure 1:
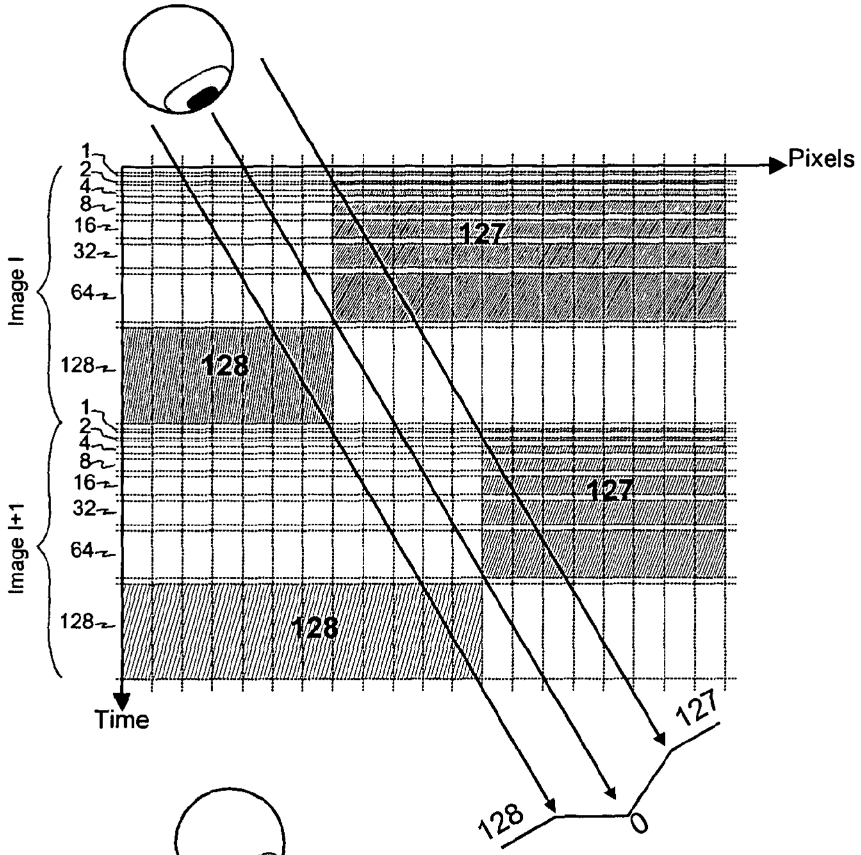
FIGS. 1 to 3 show the temporal integration of grey levels performed by the human eye on display devices operating in on/off mode.
Figure 2:
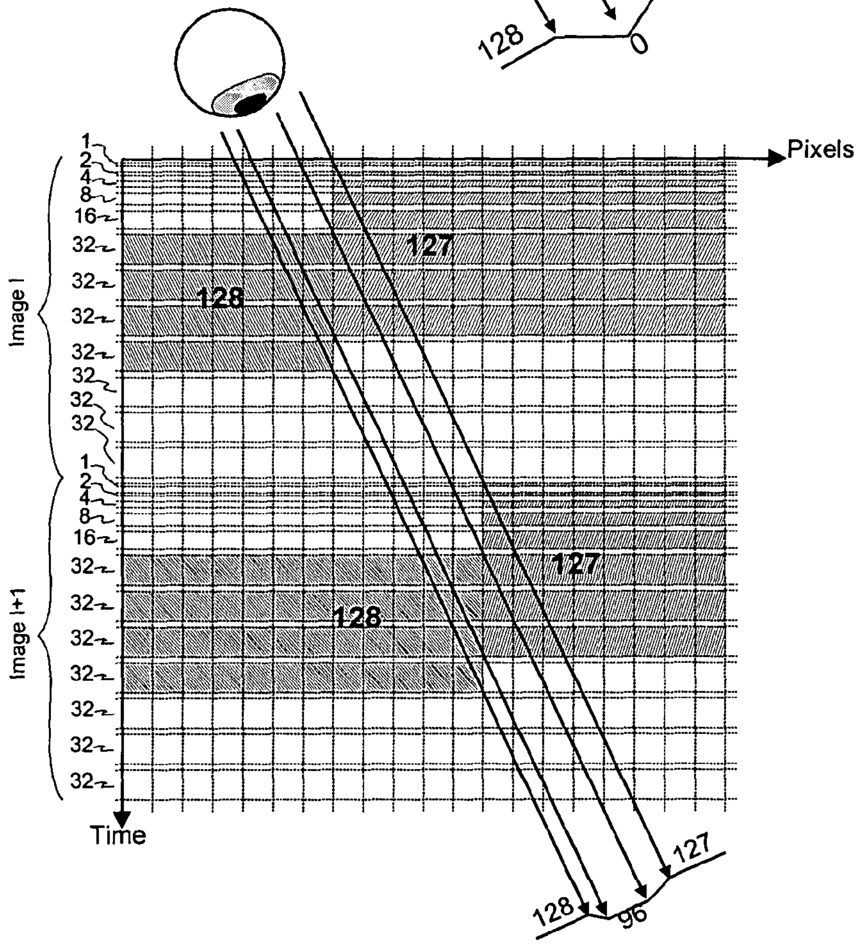
Figure 3:
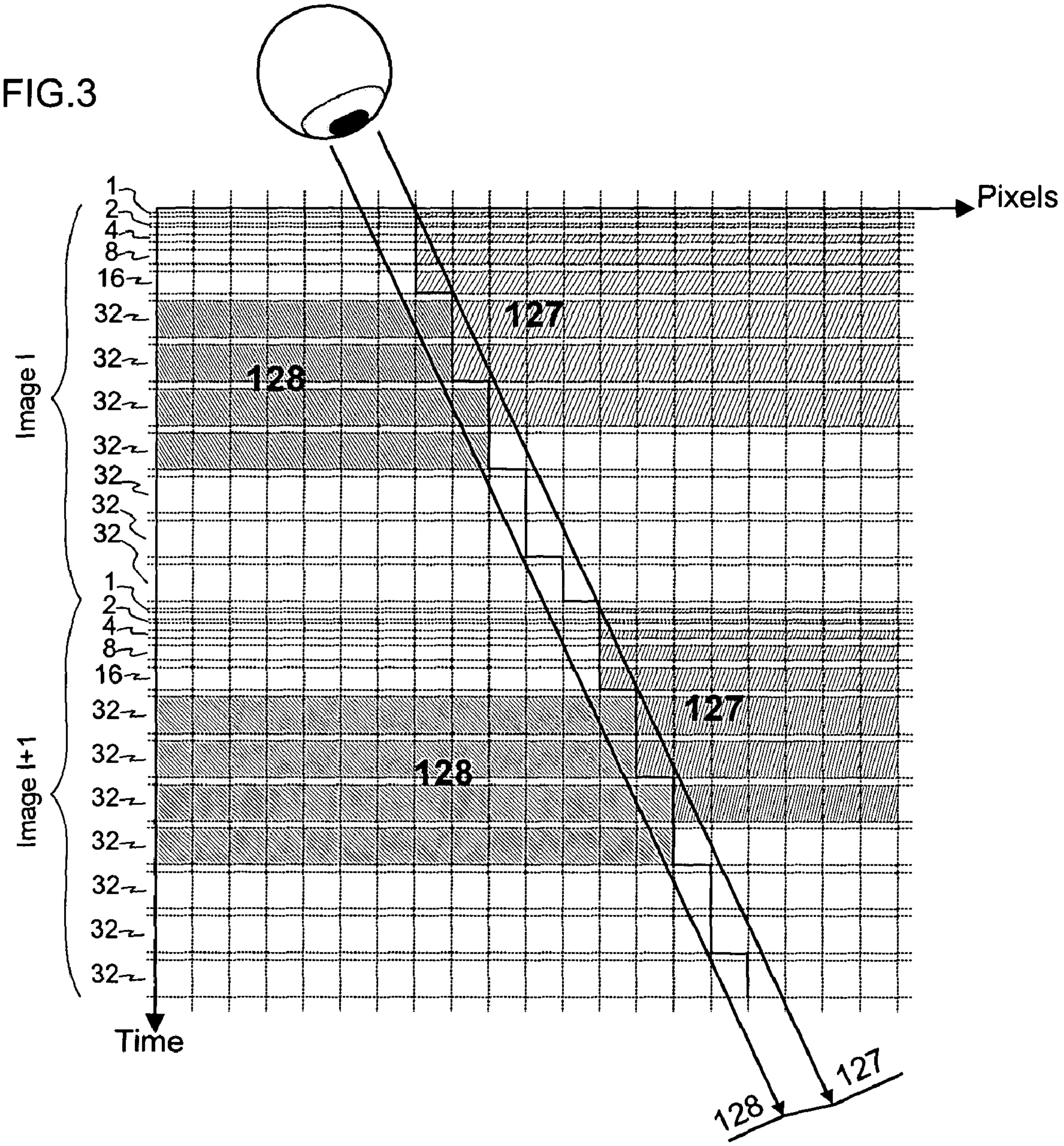

Since FIGS. 1 to 3 were described above, they will not be described in further detail.

Figure 4:
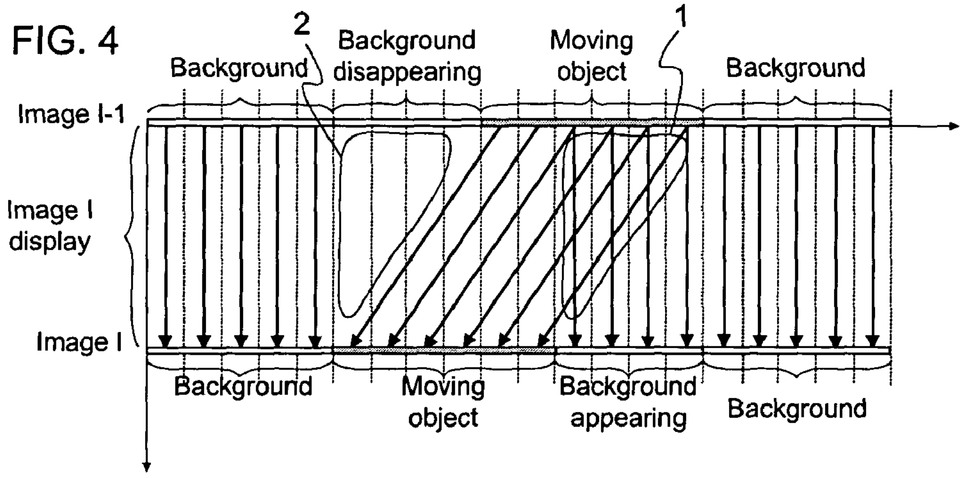
FIG. 4 shows an example of vector fields provided by a movement estimator.

FIG. 4 shows movement vectors as provided by a movement estimator. The movement estimator used by the invention is the same type as those used for carrying out the image display frequency conversion with movement compensation. The movement estimators currently used give results similar to those that a so-called perfect estimator would give. The movement vectors include a component along a horizontal axis and a component along a vertical axis of the image, which corresponds to the displacement of the point between two images (or two frames, depending whether a system is working in interlaced mode or progressive mode). For representational reasons, the image is shown only in one dimension by a linear series of points along the horizontal axis, the vertical axis representing time.

For a given image I, the movement estimator associates, with each point, a movement vector which is pointed at the previous image using known techniques. For the points corresponding to a background appearant, the estimators are capable of reliably determining the associated vectors, depending on the neighbouring vectors and on the point group textures of the current image (image I) and of the previous image (image I−1). The results obtained given rise to conflict areas 1, which correspond to crossings of movement vectors, and hole areas 2 where no vector passes.

Figure 5:
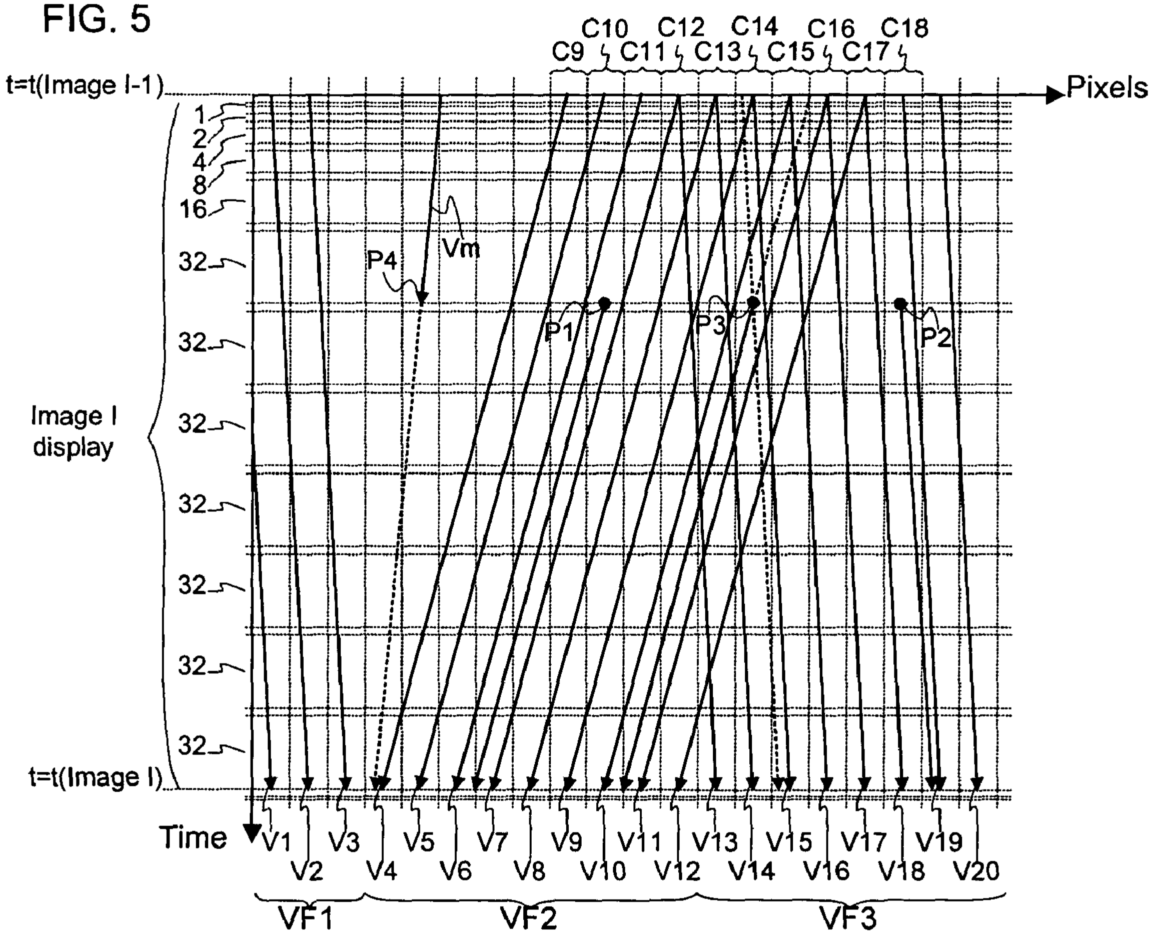
FIGS. 5 and 6 show extrapolations of movement vectors according to the invention.

According to the invention, a movement-compensated intermediate image is associated with each subfield in order to determine the on or off values of the cells for the said subfield. FIG. 5 illustrates a first way of calculating the values of the cells.

Firstly, an estimation of the movement between the image I and the image I−1 is made. The result of the movement estimation is a set of vectors V1 to V20 which all point at a single pixel of the image I. Each pixel of the image I has an associated movement vector which starts from the image I−1. In our illustrative example, the movement vectors are grouped together in vector fields VF1 to VF3. The vector fields VF1 to VF3 correspond to continuous pixel areas of the image I associated with the same movement vector, including the projection of this pixel area on the image I−1 along the axis of the associated movement vector. The grouping together is performed by comparison between the vectors associated with neighbouring pixels—if two vectors are parallel, then the two pixels belong to the same field. According to a variant, it is possible to allow two vectors to be parallel with a small margin of error, for example ±0.1 pixels of offset along the x-axis and/or the y-axis.

The calculation of an intermediate image associated with a subfield is performed at the instant corresponding to the end of the said subfield. For each pixel of the intermediate image, one observes which vector field VF1 to VF3 applies.

When a single vector field is applicable, for example for the pixels P1 and P2, one observes to which pixel the vector field corresponds on the image I by projection along the direction of the vector field VF2 or VF3, respectively. Of course, the projection cannot correspond to a pixel of the image I—in this case, the value of the closest pixel is taken for example, or a weighted average over the values of the closest pixels is taken.

If the pixel is in a conflict area, such as for example pixel P3, then which vector field applies is determined. To do this, a projection of the pixel P3, along the direction of each of the vector fields VF2 and VF3 in which the pixel P3 is placed, is taken, on the one hand, on the image I and, on the other hand, on the image I−1. Next, the difference between the values of the pixels (or the pixels resulting from a possible average) of the images I and I−1 along each of the directions is taken. Next, the absolute values of the two differences are compared so as to determine along which direction the pixels of the images I and I−1 are the closest. The field VF2 corresponding to the direction for which the pixels of the images I and I−1 are closest is then assigned to the pixel P3. Finally, this thus associates with pixel P3 the value corresponding to its projection on the image I along the direction of the field VF2 with which it is associated.

On the other hand, if the pixel is in a hole area, such as for example the pixel P4, then a vector Vm is determined according to the vector fields VF1 and VF2 surrounding the hole area. The vector Vm is calculated by averaging the vectors associated with the vector fields VF1 and VF2 surrounding the area, the average being weighted by the distance over the intermediate image which separates the pixel P3 of each vector field VF1 and VF2. Next, a projection of the pixel P3 on the image I−1 is made along the direction of the vector Vm in order to determine the value to associate with the pixel P3.

To associate an intermediate image with a subfield, in the example described above, the instant of the end of a subfield is considered as being the instant when the image must be placed, the image I corresponding to the instant of the end of the last subfield. As a variant, a person skilled in the art may also associate with the images the instants of the start of a subfield. Another variant consists in associating the image I with the first subfield of the image—in this case, it will be necessary to calculate the movement vectors with the image I+1 and delay the displaying of an image.

Figure 6:
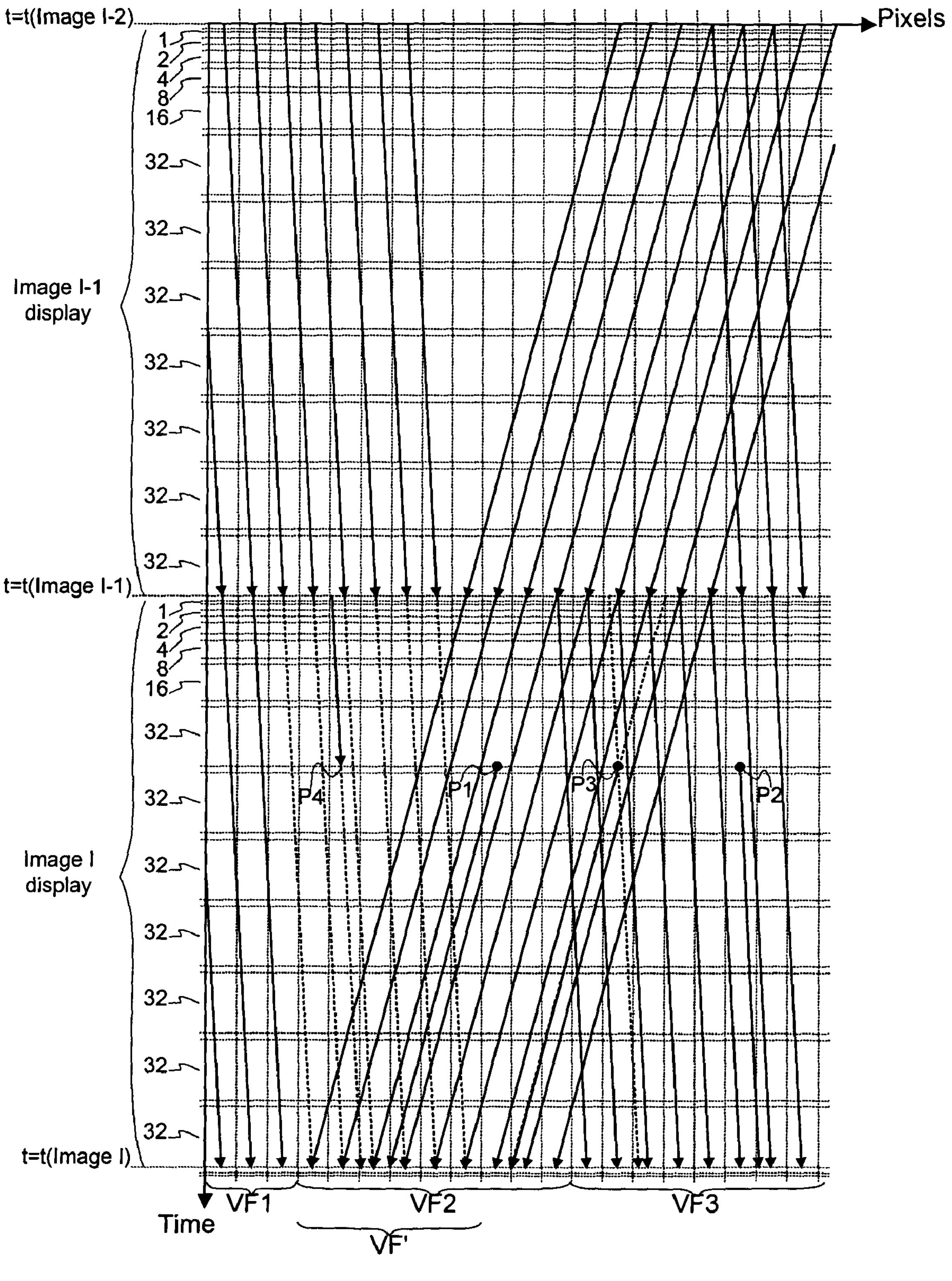

FIG. 6 shows a variant for determining the values of pixels in the hole areas. For this method, the vector fields corresponding to the extensions of the vector fields of the image I−1 are determined. Since the pixels P1 to P3 all lie in areas where at least one vector field VF2 and/or VF3 is present, the value of these pixels is determined, for example as previously. On the other hand, since the pixel P3 lies in a hole area, the vector fields VF' corresponding to the extension of a vector field calculated using the images I−1 and I−2 is taken into account. The pixel P3 is projected on the image I−1 along the direction of the vector field VF'. The value associated with the pixel P3 is equal to the value of the pixel of the image I−1 along the projection (or equal to the weighted average of the closest pixels).

Figure 7:
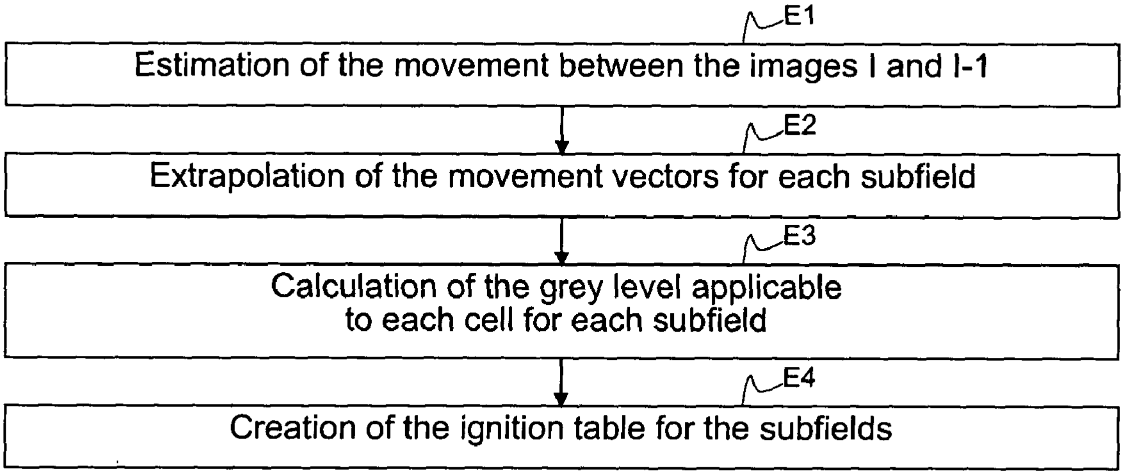
FIG. 7 shows the succession of tasks carried out in order to convert a video into commands for a display device operating in on/off mode, according to the invention.

FIG. 7 summarizes the procedure employed, whatever the method used to determine the vectors or vector direction to be applied to the various pixels of the various intermediate images. Upon receiving a new image, a first step E1 of estimating the movement between the new image I and the previous image I−1 is carried out. This movement estimation is performed according to one of the many known techniques.

After the first step E1, a second step E2 of extrapolating the movement vectors is carried out. During this second step E2, a movement vector, calculated from the movement vectors obtained during the first step E1, are associated with each pixel and for each subfield. Optionally, the movement vectors obtained for a first step E1 carried out on the previous image I−1 as explained above, may be used again.

After the second step E2 or partly simultaneously with the said step E2, a third step E3 of calculating the grey level is carried out. This third step E3 consists in determining the grey level which applies for each pixel of each subfield according to the associated calculated vector and to the current image I or to the previous image I−1, as explained above. The second and third steps E2 and E3 may overlap as soon as a movement vector has been calculated for a pixel of a subfield.

To minimize the resources needed for the invention, the calculation of the intermediate images is limited to the information needed for determining the state of the cells for the said subfield. For each subfield, the movement vector that applies is determined for each cell, but the corresponding grey level is calculated only if the movement vector does not point at a single pixel.

Finally, the encoding of the grey levels will be carried out during a step E4. According to the invention, the on or off state of a PDP is determined for a given subfield according to the pixel corresponding to the cell for the given subfield. As an example of encoding, it is considered in FIG. 5 that the grey levels associated with the pixels contained in the vector field VF2 are all at the level 127 and that the grey levels associated with the pixels contained in the field VF3 are all at the level 64. The level of the cell C12 is encoded at the level 127 and the level of the cell C18 is encoded at the level 64. The cells C13 to C17 are at intermediate levels. For the subfield of weight 1, the cells C13 to C17 belong to the field VF1. For the subfields of weights 2, 4, 8 and 16, the cells C13 to C16 belong to the field VF2, while the cell C17 belongs to the field VF3. For the first subfield of weight 32, and the cells C13 to C15 belong to the field VF2 and the cells C16 and C17 belong to the field VF3. For the second and third subfields of weight 32, the cells C13 and C14 belong to the field VF2 and the cells C15 to C17 belong to the field VF3. For the fourth and fifth subfields of weight 32, the cell C13 belongs to the field VF2 and the cells C14 to C17 belong to the field VF3. For the sixth and seventh subfields of weight 32, the cells C13 to C17 belong to the field VF3. The values then coded on the cells C13 to C17 are therefore equal to 127, 127, 95, 95 and 65, respectively. The ignition table is then created from the encoded levels using a known technique.

Figure 8:
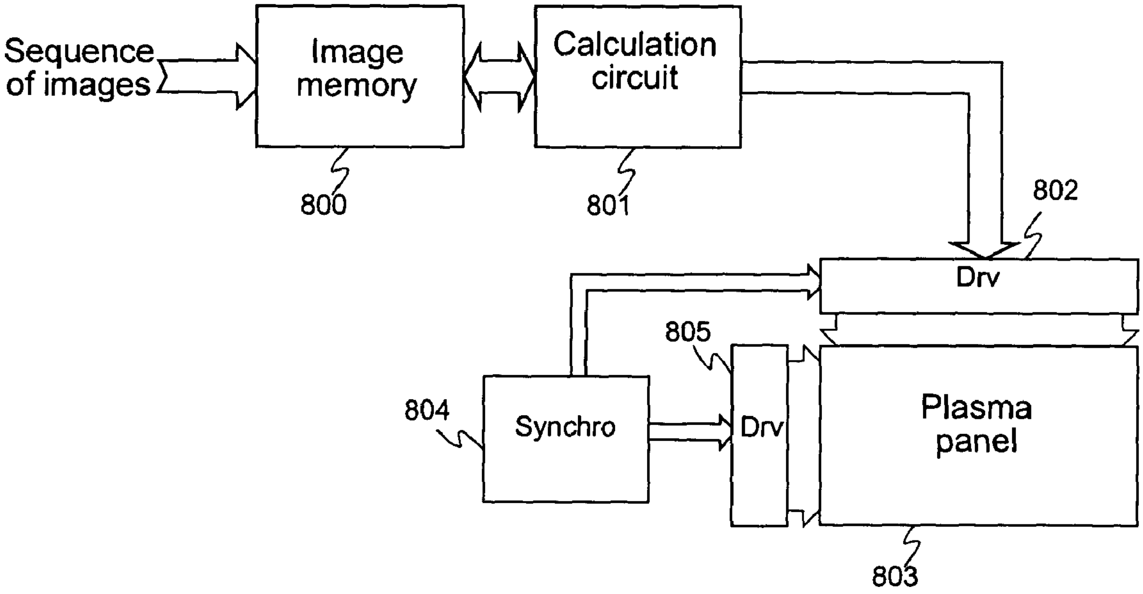
FIG. 8 shows a block diagram of one embodiment of the invention.

Very many implementation structures are possible. An illustrative example is shown in FIG. 8. An image memory 800 receives a stream of images for storing. The size of the memory 800 allows at least three images to be stored, the image I+1 being stored during the processing of the image I which uses the image I−1. A calculation circuit 801, for example a signal processor, carries out the encoding according to the process described above and delivers the turn-on signals to the column driver of a plasma panel 803. A synchronization circuit 804 synchronizes the column driver 802 and the line driver 805.

As a person skilled in the art will have understood, very many variants are possible with regard to the implementation circuit.

What is claimed is:

1. A Method for displaying a video image on a display device which comprises a plurality of cells in which the grey levels are obtained by temporal integration over a given period of a plurality of subfields for which each cell is either on or off, comprising the steps of:

estimating the movement between an image to be displayed and a previous image, the movement vectors obtained by the movement estimation being grouped in parallel vector fields, determining, for each subfield and for each cell, the movement vector to be applied, and determining, for each subfield and for each cell, the grey level according to at least one of said image to be displayed, said previous image and said movement vector, wherein, for a given subfield, if a cell is subjected to a single parallel-vector field, the movement vector and the grey level determined for said cell are respectively the corresponding movement vector of said vector field and the grey level of the image to be displayed or the previous image to which said movement vector points, if a cell is subjected to at least two parallel-vector fields, the movement vectors parallel to all the fields passing through the cell are determined, the movement vector determined for said cell is the movement vector for which the grey levels of the image to be displayed and of the previous image are the closest and the grey level determined for said cell is the grey level of the image to be displayed or the previous image to which the movement vector points, and if a cell is not subjected to any vector field, the movement vector and the grey level determined for said cell are respectively a resulting movement vector depending on the neighboring vectors estimated for the image to be displayed or the previous image and the grey level of the image to be displayed or the previous image to which said resulting movement vector points.

2. The method according to claim 1, wherein the resulting movement vector is an average of the neighboring vectors estimated for the image to be displayed.

3. A method for displaying a video image on a display device, which comprises a plurality of cells in which the grey levels are obtained by temporal integration over a given period of a plurality of subfields for which each cell is either on or off, comprising the steps of:

estimating the movement between an image to be displayed and a previous image, the movement vectors obtained by the movement estimation being grouped in parallel vector fields, determining, for each subfield and for each cell, the movement vector to be applied, and determining, for each subfield and for each cell, the grey level according to at least one of said image to be displayed, said previous image and said movement vector, wherein, for a given subfield, if a cell is subjected to a single parallel-vector field, the movement vector and the grey level determined for said cell are respectively the corresponding movement vector of said vector field and the grey level of the image to be displayed or the previous image to which said movement vector points, if a cell is subjected to at least two parallel-vector fields, the movement vectors parallel to all the fields passing through the cell are determined, the movement vector determined for said cell is the movement vector for which the grey levels of the image to be displayed and of the previous image are the closest and the grey level determined for said cell is the grey level of the image to be displayed or the previous image to which the movement vector points, and if a cell is not subjected to any vector field, the movement vector and the grey level determined for said cell are respectively a vector parallel to the field of extended vectors of the previous image which surrounds said cell and the grey level of the image to be displayed or the previous image to which said movement vector points.

4. A display device comprising:

a plurality of cells in which the grey levels are obtained by temporal integration over a given period of a plurality of subfields for which each cell is either on or off, estimation means for estimating the movement between an image to be displayed and a previous image, the movement vectors obtained by the movement estimation being grouped in parallel vector fields, and determination means for determining, for each subfield and for each cell, the movement vector to be applied and the grey level according to at least one of said image to be displayed, said previous image and said movement vector, wherein, for a given subfield, if a cell is subjected to a single parallel-vector field, the movement vector and the grey level determined for said cell by said determination means are respectively the corresponding movement vector or said vector field and the grey level of the image to be displayed or the previous image to which said movement vector points, if a cell is subjected to at least two parallel-vector fields, the movement vector determined for said cell by said determination means is, among the movement vectors parallel to all the fields passing through the cell, the movement vector for which the grey levels of the image to be displayed and of the previous image are the closest and the grey level determined for said cell is the grey level of the image to be displayed or the previous image to which the movement vector points, and if a cell is not subjected to any vector-field, the movement vector and the grey level determined for said cell by said determination means are respectively a resulting movement vector depending on the neighboring vectors estimated for the image to be displayed or the previous image and the grey level of the image to be displayed or the previous image to which said resulting movement vector points.

5. A display device comprising:

a plurality of cells in which the grey levels are obtained by temporal integration over a given period of a plurality of subfields for which each cell is either on or off, estimation means for estimating the movement between an image to be displayed and a previous image, the movement vectors obtained by the movement estimation being grouped in parallel vector fields, determination means for determining, for each subfield and for each cell, the movement vector to be applied and the grey level according to at least one of said image to be displayed, said previous image and said movement vector, and means for extending the movement vectors of the previous image, wherein, for a given subfield, if a cell is subjected to a single parallel-vector field, the movement vector and the grey level determined for said cell by said determination means are respectively the corresponding movement vector of said vector field and the grey level of the image to be displayed or the previous image to which said movement vector points, if a cell is subjected to at least two parallel-vector fields, the movement vector determined for said cell by said determination means is, among the movement vectors parallel to all the fields passing through the cell, the movement vector for which the grey levels of the image to be displayed and of the previous image are the closest and the grey level determined for said cell is the grey level of the image to be displayed or the previous image to which the movement vector points, and if a cell not subjected to any vector field, the movement vector and the grey level determined for said cell by the determination means are respectively a vector parallel to the field of extended vectors of the previous image which surrounds said cell and the grey level of the image to be a displayed or the previous image to which said movement vector points.

6. The device according to claim 4, further comprising a plasma panel.

7. The device according to claim 5, further comprising a plasma panel.

* * * * *